July 10, 1956
C. A. DUVAL, JR., ET AL
2,754,253
STABILIZATION OF FUEL OIL WITH CAUSTIC SOLUTION
Filed Aug. 12, 1953
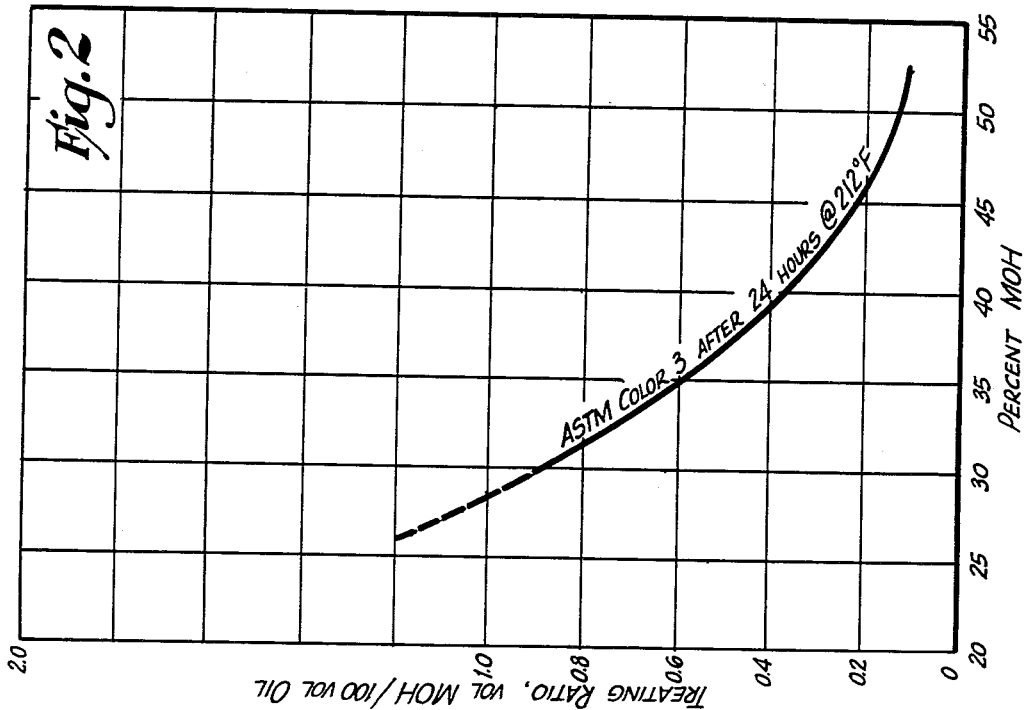
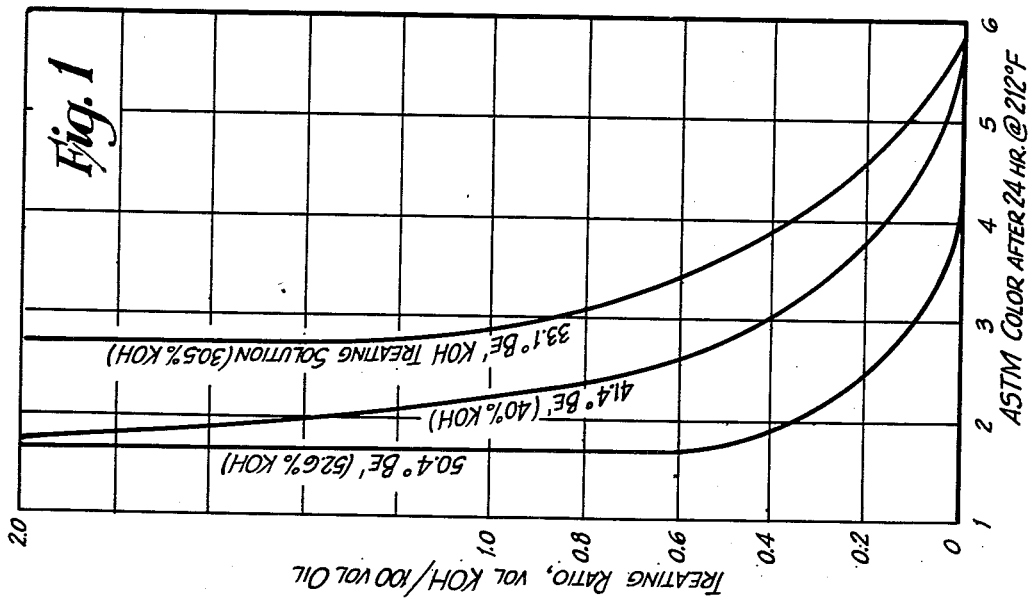
INVENTORS
CLAIBORNE A. DUVAL, JR.
WARD F. ROSEN
BY Francis J. Johnston
AGENT United States Patent Office 2,754,253
Patented July 10, 1956

2,754,253

STABILIZATION OF FUEL OIL WITH CAUSTIC SOLUTION

Claiborne A. Duval, Jr., and Ward F. Rosen, Beaumont, Tex., assignors to Socony Mobil Oil Company, Inc., a corporation of New York Application August 12, 1953, Serial No. 373,764

5 Claims. (Cl. 196—41)

The present invention relates to the stabilization of fuel with respect to color and/or sediment and, more particularly, to the stabilization of fuel with respect to color and/or sediment employing substantially stoichiometric quantities of alkali metal hydroxide in aqueous solution.

In the past light petroleum distillates such as domestic heating oils have been stabilized with respect to color and/or sediment by acid treating or by vapor phase refining or by treatment with dilute aqueous solutions of alkali metal hydroxide or by treatment with alkali metal hydroxide dissolved in organic solvents such as the lower alcohols. All of these refining methods produced more or less satisfactory results but at excessive costs when measured either by cost of treatment or loss of fuel. From the standpoint of results, the treatment with solutions of alkali metal hydroxide in organic solvents, such as lower alcohols, was the best although expensive. It has now been discovered that results equivalent to those obtained by treatment with alcoholic alkali metal hydroxide can be obtained with substantially stoichiometric quantities of aqueous alkali metal hydroxide solutions. Accordingly, it is an object of the present invention to provide a method of treating light petroleum distillates to stabilize such distillates with respect to color and/or sediment employing substantially stoichiometric quantities of aqueous alkali metal hydroxide solutions. It is another object of the present invention to provide a method of refining petroleum fractions employing aqueous solutions containing at least 30 per cent alkali metal hydroxide in a treating ratio of about 9.1 to about 2 volumes of aqueous alkali metal hydroxide solution per 100 volumes of petroleum fraction. Other objects and advantages of the present invention will become apparent from the following discussion taken in conjunction with the drawings, in which Figure 1 is a graph showing the relation between the color and/or sediment stability of a distillate domestic heating oil treated with a given volume of potassium hydroxide solutions of varying concentration. (Stability being determined by storage in a glass bottle for two months at 100° F. Satisfactory stability is obtained when after two months at 100° F. or 24 hours at 212° F. a color not greater than ASTM 3.0 and not more than 3 milligrams of sediment per 100 milliliters of oil are obtained. It is to be noted that stability determinations made by storage in a glass bottle at 212° F. for 24 hours are comparable with stability determinations made by storage in a glass bottle at 100° F. for two months.)

The data presented in Figure 1 were obtained by contacting a fraction of cracked petroleum distillate having a boiling range of 350° to 660° F. with aqueous caustic potash at an aqueous potash solution to oil ratio of 0.5 to 2 per 100 volumes of oil treated. It will be noted that solutions having a gravity of less than 40° Bé. were ineffective to produce a treated oil which, after storage in a glass bottle for two months at 100° F., had an ASTM color not greater than 3 and not more than 2 milligrams of sediment per 100 milliliters of treated oil.

The data presented in Figure 1 show that, at a treating ratio less than one volume of treating solution per 100 volumes of oil to be treated for aqueous alkali metal hydroxide solutions having a density less than about 31.7° Bé. (about 29.0 per cent alkali metal hydroxide), such solutions are ineffective to produce an ASTM color of 2 as more clearly shown in Figure 2. However, as the concentration of the alkali metal hydroxide in the aqueous treating solution is increased, the treating ratio becomes less. Thus, with an aqueous treating solution containing about 35 per cent alkali metal hydroxide, a treating ratio of 0.6 volume of treating solution per 100 volumes of oil can be used and at an alkali metal hydroxide concentration of about 50 per cent a treating ratio of 0.1 volume of treating solution per 100 volumes of oil will provide a treated oil having the desired stability with respect to color and/or sediment. It would seem unnecessary to emphasize that the relation between the concentration of alkali metal hydroxide and the treating ratio expressed as volume of treating solution per 100 volumes of oil to produce a stable oil is not linear.

In accordance with the principles of the present invention, the petroleum fraction to be stabilized with respect to color and/or sediment preferably is first dried in any suitable manner, as by contacting with solid sodium chloride until the moisture content is insufficient to lower the concentration of the aqueous alkali metal hydroxide solution below an effective concentration at the treating ratio employed. Thus, for example, when treating at a ratio of 0.6 volume 35 per cent alkali metal hydroxide solution, the oil to be treated is dried to less than 0.6 per cent water. Aqueous alkali metal hydroxide solution containing at least about 29 per cent alkali metal hydroxide is intimately mixed with the oil, to be treated in a volume to provide a treating ratio of at least 0.1 volume of aqueous treating solution per 100 volumes of oil to be treated, and not exceeding about 2 volumes of treating solution per 100 volumes of oil to be treated. When the treating solution is spent, i. e., the treated oil no longer has an ASTM color of 3 or less after storage in a glass bottle for 24 hours at 212° F. or for two months at 100° F., the spent treating solution is discarded.

We claim:

1. A method of stabilizing petroleum fractions boiling above the gasoline range with respect to at least one of color and sediment which consists of drying a petroleum fraction boiling above the gasoline range and being unstable to at least one of color and sediment contacting said dried petroleum fraction with an aqueous alkaline treating solution having as its sole essential solution at least about 29 weight per cent alkali metal hydroxide at a treating ratio of about 0.1 to not more than 2 volumes of said aqueous treating solution per 100 volumes of said petroleum fraction, and separating the so-treated petroleum fraction from said treating solution to obtain a treated petroleum fraction boiling above the gasoline range having an A. S. T. M. color not darker than 3 and containing not more than 3 milligrams of sediment per 100 milliliters of treated oil after storage in a glass bottle at 100° F. for two months.

2. The method of stabilizing petroleum fractions with respect to at least one of color and sediment as set forth and described in claim 1 wherein the petroleum fraction is a domestic heating oil distillate.

3. The method of stabilizing petroleum fractions with respect to at least one of color and sediment as set forth and described in claim 1 wherein the petroleum fraction is a domestic heating oil distillate, and the alkali metal hydroxide is potassium hydroxide.

4. The method of stabilizing petroleum fractions with respect to at least one of color and sediment as set forth and described in claim 1 wherein the petroleum fraction is a residual fuel fraction.

5. The method of stabilizing petroleum fractions with respect to at least one of color and sediment as set forth and described in claim 1 wherein the petroleum fraction is a domestic heating oil distillate, the alkali metal hydroxide is potassium hydroxide, the concentration of potassium hydroxide in the aqueous treating solution is at least 40 weight per cent, and the treating ratio is not greater than about 0.4 volume of treating solution per 100 volumes of domestic heating oil distillate.

References Cited in the file of this patent

UNITED STATES PATENTS

| | | |
|---|---|---|
| 736,479 | Berg | Aug. 18, 1903 |
| 1,784,262 | Wheeler et al. | Dec. 30, 1930 |
| 1,838,031 | Stratford et al. | Dec. 22, 1931 |
| 2,570,277 | Ricardi et al. | Oct. 9, 1951 |
| 2,591,946 | Krause et al. | Apr. 8, 1952 |
| 2,608,522 | Niehaus et al. | Aug. 26, 1952 |